United States Patent
Nam et al.

(10) Patent No.: US 10,381,690 B2
(45) Date of Patent: Aug. 13, 2019

(54) NEGATIVE ELECTRODE FOR RECHARGEABLE LITHIUM BATTERY AND RECHARGEABLE LITHIUM BATTERY INCLUDING THE SAME

(71) Applicant: SAMSUNG SDI CO., LTD., Yongin-si, Gyeonggi-do (KR)

(72) Inventors: Jung-Hyun Nam, Yongin-si (KR); Jong-Hwan Park, Yongin-si (KR); Yeon-Joo Choi, Yongin-si (KR); Eon-Mi Lee, Yongin-si (KR); Hoon Seok, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 84 days.

(21) Appl. No.: 14/228,118

(22) Filed: Mar. 27, 2014

(65) Prior Publication Data

US 2015/0050533 A1 Feb. 19, 2015

Related U.S. Application Data

(60) Provisional application No. 61/865,985, filed on Aug. 14, 2013.

(51) Int. Cl.
*H01M 8/04* (2016.01)
*H01M 10/42* (2006.01)
(Continued)

(52) U.S. Cl.
CPC ........ *H01M 10/4235* (2013.01); *H01M 4/366* (2013.01); *H01M 4/628* (2013.01); *H01M 10/0525* (2013.01); *H01M 2004/021* (2013.01)

(58) Field of Classification Search
CPC ........ H01M 4/366; H01M 4/02; H01M 4/667; H01M 2004/027; H01M 10/0525; H01M 10/4235; H01M 4/628; H01M 2004/021
See application file for complete search history.

(56) References Cited

U.S. PATENT DOCUMENTS 6,365,299 B1 * 4/2002 Miyaki ................ H01M 4/131
429/131
8,003,252 B2 8/2011 Jung et al.
(Continued)

FOREIGN PATENT DOCUMENTS

CN 1133221 C 12/2003
CN 100539257 C 9/2009
(Continued)

OTHER PUBLICATIONS

European Search Report dated Jun. 30, 2014 of the corresponding European Patent Application No. 14162829.7, noting listed references in this IDS (6 pages).
(Continued)

*Primary Examiner* — Michael L Dignan
(74) *Attorney, Agent, or Firm* — Lewis Roca Rothgerber Christie LLP (57) ABSTRACT

A negative electrode for a rechargeable lithium battery, the negative electrode including: a current collector; a negative active material layer on the current collector; and a coating layer directly contacting the negative active material layer, the coating layer including an organic material and an inorganic material, is disclosed. A rechargeable lithium battery including the same is also disclosed.

6 Claims, 5 Drawing Sheets

(51) Int. Cl.
*H01M 4/36* (2006.01)
*H01M 4/62* (2006.01)
*H01M 10/0525* (2010.01)
*H01M 4/02* (2006.01)

(56) References Cited

U.S. PATENT DOCUMENTS

| | | | |
|---|---|---|---|
| 8,263,266 | B2 | 9/2012 | Bak |
| 2004/0175621 | A1 | 9/2004 | Iriyama et al. |
| 2005/0221165 | A1 | 10/2005 | Hennige et al. |
| 2005/0266150 | A1* | 12/2005 | Yong .................. H01M 2/166 427/58 |
| 2006/0127773 | A1* | 6/2006 | Kawakami ............ H01M 4/134 429/245 |
| 2009/0286164 | A1* | 11/2009 | Wada ..................... H01M 4/131 429/338 |
| 2010/0159314 | A1 | 6/2010 | Kim et al. |
| 2010/0248026 | A1 | 9/2010 | Hinoki et al. |
| 2011/0171525 | A1* | 7/2011 | Abe ...................... H01M 4/623 429/212 |
| 2011/0177369 | A1 | 7/2011 | Endo et al. |
| 2011/0274978 | A1* | 11/2011 | Sheem .................... H01M 4/62 429/231.8 |
| 2011/0281161 | A1* | 11/2011 | Ikeda ...................... H01M 4/13 429/211 |
| 2011/0281163 | A1* | 11/2011 | Kasamatsu ........... H01M 4/133 429/213 |
| 2012/0015228 | A1 | 1/2012 | Yoon et al. |
| 2012/0034521 | A1* | 2/2012 | Matsuyama .......... H01M 4/661 429/211 |
| 2012/0276459 | A1 | 11/2012 | Im et al. |
| 2013/0089791 | A1* | 4/2013 | Chang ................... H01M 4/485 429/231.8 |
| 2015/0099167 | A1* | 4/2015 | Oshima ................. H01M 4/505 429/199 |

FOREIGN PATENT DOCUMENTS

| | | |
|---|---|---|
| CN | 102237509 A | 11/2011 |
| CN | 102646811 A | 8/2012 |
| JP | 4-28172 | 1/1992 |
| JP | 2008-103344 A | 5/2008 |
| JP | 2010-225545 A | 10/2010 |
| JP | 2010-255545 A | 11/2010 |
| JP | 2010-267475 A | 11/2010 |
| KR | 10-2005-0035281 | 4/2005 |
| KR | 10-2007-0082579 | 8/2007 |
| KR | 10-2008-0090655 | 10/2008 |
| KR | 10-2008-0106881 | 12/2008 |
| KR | 10-2009-0106841 | 10/2009 |
| KR | 10-2010-0113030 | 10/2010 |
| KR | 10-2012-0026296 | 3/2012 |
| WO | WO 2010/089898 A1 | 8/2010 |
| WO | WO 2012091301 A2 * | 7/2012 ............ H01M 4/485 |

OTHER PUBLICATIONS

Wu, et al., "Carbon anode materials for lithium ion batteries," Journal of Power Sources, vol. 114, No. 2, Mar. 12, 2003, pp. 228-236.
SIPO Office Action, with English translation, dated Nov. 16, 2017, for corresponding Chinese Patent Application No. 201410398403.6 (21 pages).
JPO Office Action dated Apr. 3, 2018, for corresponding Japanese Patent Application No. 2014-112262 (5 pages).
EPO Office Action dated May 2, 2018, for corresponding European Patent Application No. 14162829.7 (4 pages).
SIPO Office Action, with English translation, dated Aug. 2, 2018, for corresponding Chinese Patent Application No. 201410398403.6 (15 pages).
Chinese Office Action with English Translation for corresponding Chinese Patent Application No. 201410398403.6, dated Feb. 28, 2019, 15 pages.

* cited by examiner

NEGATIVE ELECTRODE FOR RECHARGEABLE LITHIUM BATTERY AND RECHARGEABLE LITHIUM BATTERY INCLUDING THE SAME

CROSS-REFERENCE TO RELATED APPLICATION

This application claims priority to and the benefit of U.S. Provisional Application No. 61/865,985, filed on Aug. 14, 2013 in the U.S. Patent and Trademark Office, the entire content of which is incorporated herein by reference.

BACKGROUND

1. Field

A negative electrode for a rechargeable lithium battery and a rechargeable lithium battery including the same are disclosed.

2. Description of the Related Art

Recently, due to reductions in size and weight of portable electronic equipment, there has been a need to develop rechargeable lithium batteries for portable electronic equipment that have both high performance and large capacity.

Oxides that include lithium and transition elements and are capable of intercalating and deintercalating lithium ions, for example, $LiCoO_2$, $LiMn_2O_4$, $LiNi_{1-x}Co_xO_2$ ($0<x<1$) and the like, have been used as positive active materials for rechargeable lithium batteries. As for negative active materials for a rechargeable lithium battery, various carbon-based materials such as artificial graphite, natural graphite, and hard carbon, which intercalate and deintercalate lithium ions, have been used.

A rechargeable lithium battery including the above-described positive and negative active materials has stability and safety problems, because the positive and negative electrodes become thermally unstable, depending on the charge state of the battery, at a temperature of greater than or equal to 25° C., and thus, the positive and negative active materials, electrolyte salt, and an organic solvent of the battery are decomposed.

In addition, due to an increasing demand for higher capacity batteries, it has become more difficult to provide higher battery stability and safety.

SUMMARY

An aspect of one embodiment of the present disclosure is directed toward a negative electrode for a rechargeable lithium battery having excellent safety, thermal stability, and cycle-life characteristics by initially suppressing (or reducing) exothermicity of the battery and preventing (or reducing the likelihood of) a short-circuit between a positive electrode and the negative electrode.

Another aspect of an embodiment of the present disclosure is directed toward a rechargeable lithium battery including the negative electrode.

According to one embodiment of the present disclosure a negative electrode for a rechargeable lithium battery includes: a current collector; a negative active material layer on the current collector; and a coating layer directly contacting the negative active material layer, the coating layer including an organic material and an inorganic material. In some embodiments, the coating layer is a single layer or has a multi-layered structure.

In some embodiments, the coating layer partially penetrates a surface of the negative active material layer.

The coating layer may be a composite layer including the organic material and the inorganic material in a single layer.

The coating layer may include an inorganic layer including the inorganic material; and an organic layer including the organic material.

In an embodiment of the negative electrode, the inorganic layer may directly contact the negative active material layer, and the organic layer may directly contact the inorganic layer; or the organic layer may directly contact the negative active material layer, and the inorganic layer may directly contact the organic layer.

The organic material may comprise a polymer particle including a polyolefin, a polyolefin derivative, a polyolefin wax, an acryl-based compound, or a combination thereof.

The organic material may include a polymer particle having a melting point in a range from 85 to 130° C. The polymer particle may include a polyolefin, a polyolefin derivative, a polyolefin wax, an acryl-based compound, or a combination thereof. The organic material may have a weight average molecular weight in a range from 300 to 10,000 g/mol. A particle size of the polymer particle may be in a range from 0.1 to 5 μm.

The organic material may be included in the negative electrode in an amount in a range from 0.5 to 10 wt % based on the total amount of the negative active material layer and the coating layer.

The inorganic material may include $SiO_2$, $Al_2O_3$, $Al(OH)_3$, $AlO(OH)$, $TiO_2$, $BaTiO_2$, $ZnO_2$, $Mg(OH)_2$, $MgO$, $Ti(OH)_4$, aluminum nitride, silicon carbide, boron nitride, or a combination thereof.

The inorganic material may have a particle size of 0.1 to 5 μm.

The inorganic material may be included in the negative electrode in an amount in a range from 1 to 20 wt % based on the total amount of the negative active material layer and the coating layer.

A thickness of the composite layer may be in a range from 1 to 20 μm.

A thickness of the inorganic layer may be in a range from 1 to 10 μm, and a thickness of the organic layer may be in a range from 1 to 10 μm.

The coating layer may further include a binder different from the organic material, and the binder may include a styrene-butadiene rubber (SBR), a carboxylmethyl cellulose (CMC), a polyvinylidene fluoride (PVdF), a polyvinylidene fluoride-hexafluoropropylene (PVdF-HFP) copolymer, an ethylenevinylacetate (EVA), a hydroxyethyl cellulose (HEC), a polyvinyl alcohol (PVA), a polyvinylbutyral (PVB), an ethylene-acrylic acid copolymer, an acrylonitrile, a vinyl acetate derivative, a polyethylene glycol, an acryl-based rubber, or a combination thereof.

According another embodiment of the present disclosure, a rechargeable lithium battery includes the negative electrode; a positive electrode facing the negative electrode; an electrolyte solution impregnating the negative electrode and the positive electrode; and a separator between the negative electrode and the positive electrode.

The separator may include an organic material, and a melting point of the organic material of the separator may be higher than a melting point of the organic material of the coating layer.

Additional embodiments of the present disclosure are included in the following detailed description.

According to aspects of the present disclosure, a rechargeable lithium battery having excellent safety, thermal stability, and cycle-life characteristics may be realized by initially suppressing (or reducing) exothermicity and preventing (or reducing the likelihood of) a short-circuit between the positive electrode and the negative electrode.

BRIEF DESCRIPTION OF THE DRAWINGS

The accompanying drawings, together with the specification, illustrate embodiments of the present invention, and, together with the description, serve to explain the principles of the present invention.

DETAILED DESCRIPTION

Hereinafter, only certain embodiments of the present invention are shown and described, by way of illustration. However, these embodiments are exemplary, and this disclosure is not limited thereto. As those skilled in the art would recognize, the invention may be embodied in many different forms and should not be construed as being limited to the embodiments set forth herein. Also, in the context of the present application, when a first element is referred to as being "on" a second element, it can be directly on the second element or be indirectly on the second element with one or more intervening elements interposed therebetween. Like reference numerals designate like elements throughout the specification.

A rechargeable lithium battery according to one embodiment will now be described with reference to FIG. 1.

Figure 1:
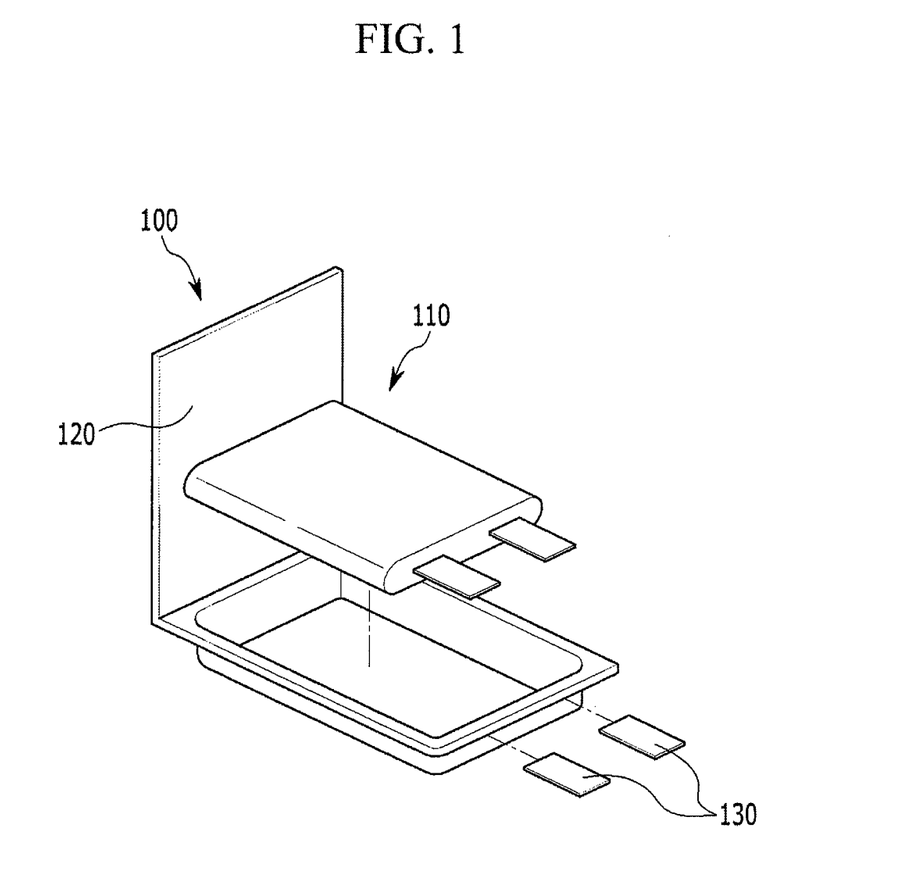
FIG. 1 is a schematic view showing a rechargeable lithium battery according to one embodiment in an unassembled state.

FIG. 1 is a schematic view of a rechargeable lithium battery according to one embodiment.

Referring to FIG. 1, a rechargeable lithium battery 100 according to one embodiment includes an electrode assembly 110, a battery case 120 housing the electrode assembly 110, and an electrode tab 130 that provides an electrical channel for transmitting a current formed in the electrode assembly 110 out of the rechargeable lithium battery. The battery case 120 may include two sides that are overlapped with one another and sealed. In addition, an electrolyte solution is injected into the battery case 120 housing the electrode assembly 110.

The electrode assembly 110 includes a positive electrode, a negative electrode facing the positive electrode, and a separator between the positive electrode and the negative electrode.

The negative electrode according to one embodiment includes a current collector, a negative active material layer on the current collector, and a coating layer on (e.g., directly contacting) the negative active material layer. The coating layer may be a single layer or may have a multi-layered structure and may include an organic material and an inorganic material. In some embodiments, the coating layer partially penetrates a surface of the negative active material layer. For example, the coating layer may be directly coated on the negative active material layer to partially penetrate the negative active material layer.

In some embodiments, the organic material is coated on the negative active material layer. For example, the organic material may be directly coated on the negative active material to directly contact the negative active material layer. The organic material may prevent (or reduce) movement of lithium ions at a temperature of 85 to 130° C. due to a shut-down function of the organic material, thereby increasing internal resistance of the battery and deteriorating electrical/chemical reactivity of the battery at the temperature.

For example, when the organic material of the coating layer has a shut-down function, the organic material may melt at temperatures of 85 to 130° C., thereby blocking or occluding pores of the separator and/or pores of the coating layer to prevent (or reduce) the movement of lithium ions between the negative electrode and the positive electrode. Accordingly, when an organic material capable of shutting down (e.g., an organic material having a shut-down function) is coated on an electrode, for example, on the surface of the negative electrode, exothermicity of a battery including the electrode may be initially suppressed (or reduced). For example, the coating layer described herein may prevent (or reduce the likelihood of) thermal runaway of the battery and improve the safety of the battery by blocking (or reducing) movement of lithium ions between the positive electrode and the negative electrode at temperatures of 85 to 130° C., or higher.

In addition, the inorganic material may be coated (e.g., directly coated) on the negative active material layer and may form an electrically insulating layer on an electrode, for example, on the surface of a negative electrode and thus, the inorganic material may prevent (or reduce the likelihood of) a short-circuit between the positive electrode and the negative electrode.

Accordingly, when the organic material and the inorganic material are coated on the surface of a negative electrode, exothermicity of a battery of including the negative electrode may be initially suppressed (or reduced), and a short-circuit between the positive electrode and the negative electrode may be prevented (or the likelihood of such a short circuit may be reduced), thereby improving safety, thermal stability, and cycle-life characteristics of the rechargeable lithium battery.

On the other hand, when the organic material and the inorganic material are coated on a surface of a separator substrate, the separator may be broken due to a physical impact, thereby nullifying the effects of the organic material. According to one embodiment of the present disclosure, the organic material and/or the inorganic material are directly coated on a surface of an electrode, which provides strong support for the organic material and the inorganic material, and thus, results in a more stable rechargeable lithium battery having improved safety, as compared to a rechargeable lithium battery prepared by coating the organic material and the inorganic material on a surface of a separator substrate. In addition, the organic material and the inorganic material may protect the electrode, prevent (or reduce) detachment of an electrode active material of the electrode and decrease surface roughness of the electrode, thereby preventing (or reducing the likelihood of) the occurrence of a defect due to electrode friction during assembly of the battery.

Figure 2:
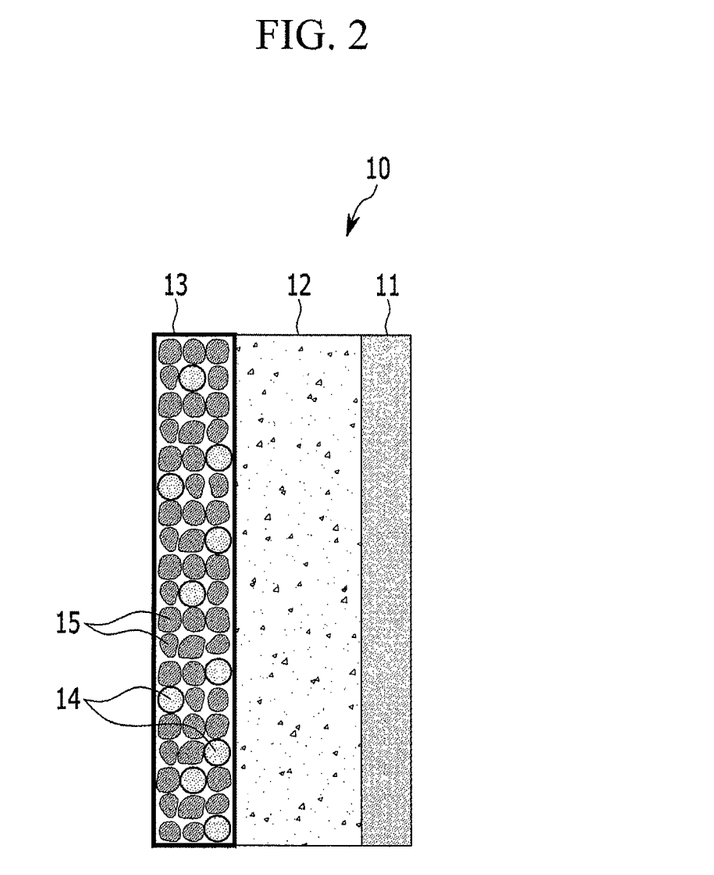
FIG. 2 is a cross-sectional view of a negative electrode for a rechargeable lithium battery according to one embodiment.
Figure 3:
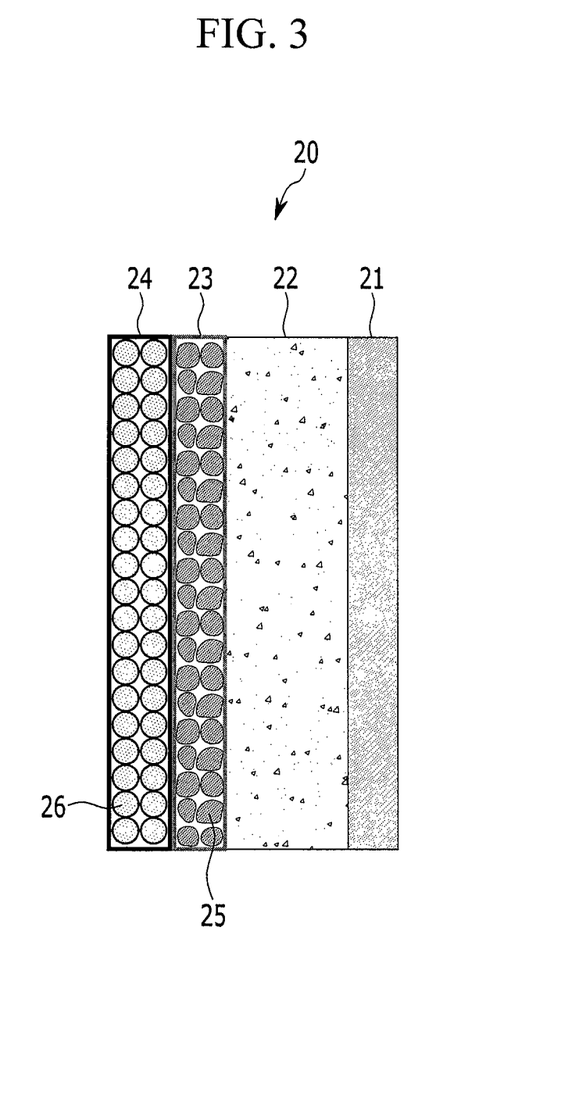
FIG. 3 is a cross-sectional view of a negative electrode for a rechargeable lithium battery according to another embodiment.
Figure 4:
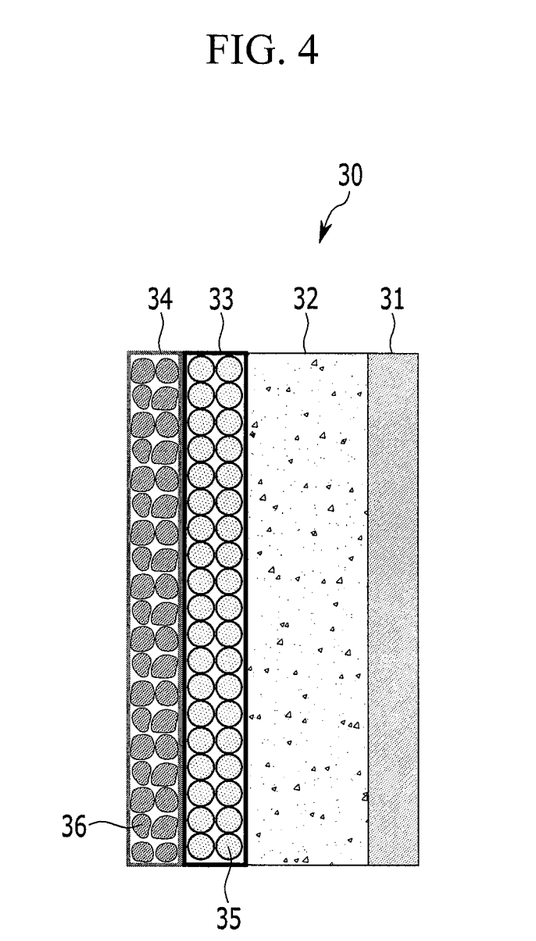
FIG. 4 is a cross-sectional view of a negative electrode for a rechargeable lithium battery according to yet another embodiment.

The structures of embodiments of the negative electrode are illustrated in FIGS. 2 to 4. FIGS. 2 to 4 provide illustrations of embodiments of the negative electrode, but the negative electrode is not limited thereto.

FIG. 2 is a cross-sectional view showing a structure of one embodiment of a negative electrode for a rechargeable lithium battery.

Referring to FIG. 2, one embodiment of a negative electrode 10 for a rechargeable lithium battery includes a current collector 11, a negative active material layer 12 on the current collector 11, and a coating layer on the negative active material layer 12. In the embodiment shown in FIG. 2, the coating layer has a single layer structure. For example, the coating layer may be a composite layer 13 in which an organic material 14 and an inorganic material 15 form a single layer.

When an organic material and an inorganic material are coated on an electrode, for example, on a surface of a negative electrode as a single layer, the organic material may shut down a battery including the layer when the battery reaches high temperatures and, thus, initially suppress (or reduce) exothermicity of the battery. The inorganic material has an electrical insulation property and, thus, may prevent (or reduce the likelihood of) a short-circuit between a positive electrode and the negative electrode. Accordingly, safety, thermal stability, and cycle-life characteristics of the rechargeable lithium battery may be improved by including the organic material and the inorganic material in a coating layer of the rechargeable lithium battery.

FIG. 3 is a cross-sectional view showing a structure of another embodiment of a negative electrode for a rechargeable lithium battery.

Referring to FIG. 3, one embodiment of a negative electrode 20 for a rechargeable lithium battery includes a current collector 21, a negative active material layer 22 on the current collector 21, and a coating layer on (e.g., directly contacting) the negative active material layer 22. In FIG. 3, the coating layer has a multi-layered structure and, includes an inorganic layer 23 including an inorganic material 25 and an organic layer 24 including an organic material 26. Herein, in this embodiment, the inorganic layer 23 may be coated on (e.g., directly coated on) the negative active material layer 22, and the organic layer 24 may be coated on (e.g., directly coated on) the inorganic layer 23.

When an organic material and an inorganic material are coated on an electrode, for example, on a surface of a negative electrode (e.g., the inorganic material is coated, or directly coated, on the surface of the negative electrode, and the organic material is coated, or directly coated, as a separate layer thereon), the organic material may initially suppress (or reduce) exothermicity of a battery including the organic material and the inorganic material due to a shut-down function of the organic material. The inorganic material may prevent (or reduce the likelihood of) a short-circuit between a positive electrode and the negative electrode due to an electrical insulation property of the inorganic material. Accordingly, safety, thermal stability, and cycle-life characteristics of the rechargeable lithium battery may be improved.

FIG. 4 is a cross-sectional view showing a structure of yet another embodiment of a negative electrode for a rechargeable lithium battery.

Referring to FIG. 4, one embodiment of a negative electrode 30 for a rechargeable lithium battery includes a current collector 31, a negative active material layer 32 on the current collector 31, and a coating layer on the negative active material layer 32. In FIG. 4, the coating layer has a multi-layered structure. For example, the coating layer may include an organic layer 33 including an organic material 35 and an inorganic layer 34 including an inorganic material 36. Herein, in this embodiment, the organic layer 33 may be coated on (e.g., directly coated on) the negative active material layer 32, and the inorganic layer 34 may be coated on (e.g., directly coated on) the organic layer 33.

When an organic material and an inorganic material are coated on an electrode, for example on a surface of a negative electrode (e.g., the organic material is coated, or directly coated, on the surface of the negative electrode, and an inorganic material is coated, or directly coated, thereon as a separate layer), the organic material may initially suppress (or reduce) exothermicity of a battery including the organic material and the inorganic material due to a shut-down function of the organic material. The inorganic material may prevent (or reduce the likelihood of) a short-circuit between a positive electrode and the negative electrode due to an electrical insulation property of the inorganic material. Accordingly, safety, thermal stability, and cycle-life characteristics of the rechargeable lithium battery may be improved.

The organic material included in the composite layer and the organic layer in FIGS. 2 to 4 may include a polymer particle having a melting point in a range from 85 to 130° C. When the organic material has a melting point within the foregoing range, exothermicity of a battery including the organic material may be initially suppressed (or reduced) due to a shut-down function of the organic material.

According to an embodiment, the separator includes an organic material such as a polyolefin based polymer, and the melting point of the organic material of the separator is higher than the melting point of the organic material of the coating layer.

The organic material of the separator may have a melting point of 130° C. or more, and thus, the separator may carry out a shut-down function at a temperature of 130° C. or more. However, in the case of a battery having a high energy density for high capacity or in the case of using an active material having decreased structural or chemical stability, initial exothermicity of the battery rapidly increases when the battery has abnormal exothermicity, and thus, it is difficult to control the stability of the battery with only the shut-down function of the separator. Accordingly, in one embodiment, an organic material having a lower melting point than that of the organic material of the separator is coated on the negative active material layer, and the organic material coated on the negative active material layer may be first melted and shut-down at a temperature lower than 130° C. Thus, electrical/chemical reactivity may be suppressed at a lower temperature and exothermicity of the battery may be initially suppressed. In other words, the reactivity of a battery may be primarily suppressed by a shut-down of an organic material coated on the negative active material layer, and then shut-down of the organic material of the separator may be secondarily generated. Accordingly, the stability of a battery may be effectively obtained or improved.

For example, the polymer particle may include a polyolefin, a polyolefin derivative, a polyolefin wax, an acryl-based compound, or a combination thereof. The polyolefin may be, for example, polyethylene, polypropylene, or a combination thereof. In some embodiments of the negative electrode, the polymer particle of the organic material includes polyethylene.

A weight average molecular weight of the organic material may be in a range from 300 to 10,000 g/mol, for example, 2,000 to 6,000 g/mol. An average particle size of the polymer particle may be in a range from 0.1 to 5 μm, for example, 0.2 to 3 μm. When the polymer particle has a weight average molecular weight and an average particle size within one of the foregoing ranges, the polymer may minimize (or reduce) resistance to the movement of lithium ions, secure good performance of a battery including the organic material, reinforce a shut-down function of the organic material, and thus, initially suppress (or reduce) exothermicity of the battery.

The organic material may be included in the negative electrode in an amount in a range from 0.5 to 10 wt %, for example, 3 to 7 wt %, based on the total amount of the negative active material layer and the coating layer. When the organic material is included within either of the foregoing ranges, its shut-down function is further reinforced, and exothermicity of a battery including the organic material may be initially suppressed (or reduced).

The inorganic material included in the composite layer and the inorganic layer in FIGS. 2 to 4 may include $SiO_2$, $Al_2O_3$, $Al(OH)_3$, $AlO(OH)$, $TiO_2$, $BaTiO_2$, $ZnO_2$, $Mg(OH)_2$, MgO, $Ti(OH)_4$, aluminum nitride, silicon carbide, boron nitride, or a combination thereof.

An average particle size of the inorganic material may be in a range from 0.1 to 5 μm, for example, 0.3 to 1 μm. When the inorganic material particle has an average particle size within either of the foregoing ranges, the inorganic material may be uniformly coated on the negative active material layer and thus, prevent (or prevent the likelihood of) a short-circuit between a positive electrode and the negative electrode due to an excellent electrical insulation property of the inorganic material. In addition, the inorganic material layer may minimize (or reduce) resistance to the movement of lithium ions and secure good battery performance.

The inorganic material may be included in an amount in a range from 1 to 20 wt %, for example, 5 to 12 wt % based on the total amount of the negative active material layer and the coating layer. When the inorganic material is included within either of the above ranges, the inorganic material has an excellent electrical insulation property and may prevent (or reduce the likelihood of) a short-circuit between a positive electrode and the negative electrode.

In FIG. 2, a thickness of the composite layer including the organic material and the inorganic material may be in a range from 1 to 20 μm, for example, 2 to 10 μm. When the composite layer has a thickness within either of the foregoing ranges, the composite layer has an excellent shut-down function and electrical insulation property and, thus, may initially suppress (or reduce) exothermicity of a battery and prevent (or reduce the likelihood of) a short-circuit between a positive electrode and the negative electrode. In addition, the composite layer may minimize (or reduce) resistance to the movement of lithium ions and minimize (or reduce) the thickness of the coating layer and, thus, secure good battery performance.

In FIGS. 3 and 4, a thickness of the inorganic layer may be in a range from 1 to 10 μm, for example, 2 to 7 μm, and a thickness of the organic layer may be in a range from 1 to 10 μm, for example, 3 to 7 μm. When the inorganic and organic layers each have a thickness within one of their respective ranges, a short-circuit between the positive electrode and the negative electrode may be prevented (or the likelihood of such a short-circuit may be reduced) due to an excellent electrical insulation property, and exothermicity of a battery may be initially suppressed (or reduced) due to a reinforced shut-down function. In addition, the inorganic and organic layers may minimize (or reduce) resistance to movement of lithium ions and may minimize (or reduce) the thickness of a coating layer and, thus, secure good battery performance.

The coating layer, for example, the composite layer of FIG. 2, may further include a binder as well as the organic material and the inorganic material. In FIGS. 3 and 4, the organic layer may further include a binder as well as the organic material, and the inorganic layer may further include a binder as well as the inorganic material.

The binder may be a material that is different from the organic material. Examples of the binder may include a styrene-butadiene rubber (SBR), a carboxylmethyl cellulose (CMC), a polyvinylidene fluoride (PVdF), a polyvinylidene fluoride-hexafluoropropylene (PVdF-HFP) copolymer, an ethylenevinyl acetate (EVA), hydroxyethyl cellulose (HEC), a polyvinyl alcohol (PVA), a polyvinylbutyral (PVB), an ethylene-acrylic acid copolymer, an acrylonitrile, a vinyl acetate derivative, a polyethylene glycol, an acryl-based rubber, and a combination thereof. In some embodiments of the negative electrode, the styrene-butadiene rubber (SBR), a mixture of the styrene-butadiene rubber (SBR) and the carboxylmethyl cellulose (CMC), the ethylenevinylacetate (EVA), the polyvinyl alcohol (PVA), the ethylene-acrylic acid copolymer, and/or the acryl-based rubber may be used as the binder.

When the binder is included in the coating layer, adherence to the surface of the negative electrode is improved, and adherence between organic material particles, between inorganic material particles, and/or between the organic material particles and the inorganic material particles may be improved.

The current collector of the negative electrode may be a copper foil.

The negative active material layer includes a negative active material, a binder, and, optionally, a conductive material.

The negative active material may include a material that reversibly intercalates/deintercalates lithium ions, a lithium metal, a lithium metal alloy, a material capable of doping and dedoping lithium, or a transition metal oxide.

The material that reversibly intercalates/deintercalates lithium ions is a carbon material, and may be any suitable carbon-based negative active material generally used in rechargeable lithium batteries. Examples of the carbon-based negative active material may include crystalline carbon, amorphous carbon or a mixture thereof. The crystalline carbon may be non-shaped, or sheet, flake, spherical, or fiber shaped natural graphite or artificial graphite, and the amorphous carbon may be a soft carbon (e.g., carbon sintered at a low temperature), a hard carbon, mesophase pitch carbonized products, fired coke, and the like.

The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping and dedoping lithium may be Si, $SiO_x$ (0<x<2), a Si—C composite, a Si-Q alloy (wherein Q is an alkali metal, an alkaline-earth metal, Group 13 to 16 elements, transition metal, a rare earth element, or a combination thereof, and is not Si), Sn, $SnO_2$, a Sn—C composite, Sn—R (wherein R is an alkali metal, an alkaline-earth metal, Group 13 to 16 elements, transition metal, a rare earth element, or a combination thereof, and not Sn), and the like, and at least one of these materials may be mixed with $SiO_2$. Examples of the Q and R may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The transition metal oxide may be vanadium oxide, lithium vanadium oxide, and the like.

The binder of the negative active material layer improves binding properties of the negative active material particles with one another and with a current collector. Examples of the binder of the negative active material layer may include a polyvinyl alcohol, a carboxylmethyl cellulose, a hydroxypropyl cellulose, a polyvinylchloride, a carboxylated polyvinylchloride, a polyvinylfluoride, an ethylene oxide-containing polymer, a polyvinylpyrrolidone, a polyurethane, a polytetrafluoroethylene, a polyvinylidene fluoride, a polyethylene, a polypropylene, a styrene-butadiene rubber, an acrylated styrene-butadiene rubber, an epoxy resin, nylon, and the like, but the binder is not limited thereto.

The conductive material improves conductivity of an electrode. Any suitable, electrically conductive material may be used as the conductive material, unless it causes a chemical change in the battery. Examples of the conductive material may include a carbon-based material such as natural graphite, artificial graphite, carbon black, acetylene black, ketjen black, carbon fiber and the like; a metal-based material such as a metal powder or a metal fiber and the like of copper, nickel, aluminum, silver, and the like; a conductive polymer such as a polyphenylene derivative and the like; or a mixture thereof.

The negative electrode may be manufactured by a method including mixing the negative active material, the binder and the conductive material in a solvent to prepare a negative active material composition, and coating the negative active material composition on a negative current collector. Examples of the solvent include N-methylpyrrolidone and the like, but the solvent is not limited thereto.

The positive electrode may include a current collector and a positive active material layer on the current collector.

An example of the current collector may include aluminum, but the current collector is not limited thereto.

The positive active material layer includes a positive active material.

The positive active material may be a compound (e.g., a lithiated intercalation compound) capable of intercalating and deintercalating lithium, for example, a lithium metal oxide.

The lithium metal oxide may be, for example, an oxide including lithium and at least one metal selected from cobalt, manganese, nickel, and aluminum. For example, compounds represented by the following chemical formulae may be used.

$Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_c Mn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $LiFePO_4$.

In the above chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The lithium metal oxide may be, for example, lithium nickel cobalt manganese oxide, lithium nickel cobalt aluminum oxide, or a combination thereof. In some embodiments of the negative electrode, a mixture of lithium nickel cobalt manganese oxide and lithium nickel cobalt aluminum oxide may be used as the lithium metal oxide.

The positive active material layer may further include a binder and a conductive material as well as the above-described positive active material.

The binder of the positive active material layer improves binding properties between the electrode active material particles and also attaches the electrode active material to the positive current collector. Examples of the positive active material layer may include a polyvinyl alcohol, a carboxylmethyl cellulose, a hydroxypropyl cellulose, a diacetyl cellulose, a polyvinylchloride, a carboxylated polyvinylchloride, a polyvinylfluoride, an ethylene oxide-containing polymer, a polyvinylpyrrolidone, a polyurethane, a polytetrafluoroethylene, a polyvinylidene fluoride, a polyethylene, a polypropylene, a styrene-butadiene rubber, an acrylated styrene-butadiene rubber, an epoxy resin, nylon, and the like, but the binder of the positive active material layer is not limited thereto.

The conductive material of the positive active material layer improves conductivity of the positive electrode. Any suitable, electrically conductive material may be used as the conductive material, unless it causes a chemical change in the battery. Examples of the conductive material may include a carbon-based material such as natural graphite, artificial graphite, carbon black, acetylene black, ketjen black, a carbon fiber, or the like; a metal-based material such as a metal powder or a metal fiber or the like of copper, nickel, aluminum, silver, or the like; a conductive polymer such as a polyphenylene derivative or the like; or a mixture thereof.

The electrolyte solution may include a non-aqueous organic solvent and a lithium salt.

The non-aqueous organic solvent serves as a medium for transmitting ions taking part in the electrochemical reaction of the battery. The non-aqueous organic solvent may be selected from a carbonate-based solvent, an ester-based solvent, an ether-based solvent, a ketone-based solvent, an alcohol-based solvent, and an aprotic solvent.

The carbonate-based solvent may include, for example, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and/or the like.

The carbonate-based solvent may include linear carbonate compounds and/or cyclic carbonate compounds. When the linear carbonate compounds and cyclic carbonate compounds are mixed, an organic solvent having high dielectric constant and low viscosity can be provided. The cyclic carbonate and the linear carbonate are mixed together in a volume ratio in a range from about 1:1 to about 1:9.

The ester-based solvent may include, for example, n-methylacetate, n-ethylacetate, n-propylacetate, dimethyl-acetate, methylpropionate, ethylpropionate, γ-butyrolactone, decanolide, valerolactone, mevalonolactone, caprolactone, and/or the like. The ether solvent may include, for example, dibutylether, tetraglyme, diglyme, dimethoxyethane, 2-methyltetrahydrofuran, tetrahydrofuran, and/or the like, and the ketone-based solvent may include cyclohexanone, and/or the like. The alcohol-based solvent may include, for example, ethyl alcohol, isopropyl alcohol, and/or the like.

The non-aqueous organic solvent may be used singularly or in a mixture. When the organic solvent is used in a mixture, the mixing ratio of the mixture may be controlled in accordance with a desirable battery performance.

The non-aqueous electrolyte solution may further include an overcharge inhibitor additive such as ethylenecarbonate, pyrocarbonate, and/or the like.

The lithium salt is dissolved in an organic solvent, supplies lithium ions in a battery, enables operation of the rechargeable lithium battery, and improves lithium ion transportation between positive and negative electrodes therein.

The lithium salt may include $LiPF_6$, $LiBF_4$, $LiSbF_6$, $LiAsF_6$, $LiN(SO_3C_2F_6)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), $LiCl$, $LiI$, $LiB(C_2O_4)_2$ (lithium bis(oxalato) borate, LiBOB), or a combination thereof, as a supporting electrolytic salt.

The lithium salt may be used in a concentration in a range from about 0.1 M to about 2.0 M. When the lithium salt is included within the above concentration range, the electrolyte may have improved performance and lithium ion mobility due to good electrolyte conductivity and viscosity.

The separator may include any materials commonly used in lithium batteries as long as the separator is capable of separating a negative electrode from a positive electrode and providing a transporting passage for lithium ions. For example, the separator may be made of a material having a low resistance to ion transportation and an improved ability for impregnation of an electrolyte. For example, the material of the separator may be selected from glass fiber, polyester, TEFLON® (tetrafluoroethylene; TEFLON is a registered trademark of E. I. Du Pont de Nemours and Company, Wilmington, Del.), polyethylene, polypropylene, polytetrafluoroethylene (PTFE), and a combination thereof. It may have a form of a non-woven fabric or a woven fabric. For example, a polyolefin-based polymer separator such as polyethylene, polypropylene or the like is mainly used for a lithium ion battery. In order to ensure good heat resistance and/or mechanical strength, a coated separator including a ceramic component and/or a polymer material may be used. For example, the separator may have a mono-layered or multi-layered structure.

Hereinafter, embodiments of the present disclosure are described in more detail with reference to examples by way of illustration. However, the present disclosure is not limited to the examples disclosed herein.

Furthermore, what is not described in this disclosure may be sufficiently understood by those who have knowledge in the field relevant to this disclosure and will not be illustrated or described here.

Example 1

Manufacture of Negative Electrode

An organic layer composition was prepared by mixing 98 wt % of polyethylene particles (Mitsui Chemicals, Inc, Chemipearl W401) having a melting point of 110° C., an average particle size of 1 μm, and a weight average molecular weight of 5,000 g/mol; and 2 wt % of an acryl-based rubber (ZEON Corporation, BM-900B) in water.

An inorganic layer composition was prepared by mixing 95 wt % of $Al_2O_3$ (Sumitomo Chemical Co., AES-12) having a particle size of 0.45 μm, and 5 wt % of an acryl-based rubber (ZEON Corporation, BM-520B) in an N-methylpyrrolidone solvent.

A slurry was prepared by adding 97.5 wt % of graphite, 1.5 wt % of a styrene-butadiene rubber (SBR), and 1 wt % of carboxylmethyl cellulose (CMC) to water as a solvent.

The slurry was coated on a copper foil and dried, and then pressed with a roll presser to form a negative active material layer. Subsequently, the inorganic layer composition was coated on the negative active material layer to form an inorganic layer, and the organic layer composition was coated on the inorganic layer to form an organic layer, thereby manufacturing a negative electrode. In this example, the inorganic layer was 6 μm thick, and the organic layer was 2 μm thick. Herein, the polyethylene particle and the $Al_2O_3$ were included in amounts of 1.6 wt % and 9.8 wt %, respectively, based on the total weight of the negative active material layer and a coating layer including the inorganic layer and the organic layer.

(Manufacture of Positive Electrode)

A slurry was prepared by combining 94 wt % of a mixture including 90 wt % of $LiNi_{0.33}Co_{0.33}Mn_{0.33}O_2$ and 10 wt % of $LiNi_{0.8}Co_{0.15}Al_{0.05}O_2$, 3 wt % of carbon black, and 3 wt % of polyvinylidene fluoride in an N-methylpyrrolidone (NMP) solvent. The slurry was coated on an aluminum (Al) thin film and dried, and then pressed with a roll presser, thereby manufacturing a positive electrode.

(Preparation of Electrolyte Solution)

An electrolyte solution was prepared by mixing ethylene carbonate, ethylmethyl carbonate, and dimethyl carbonate in a volume ratio of 2:4:4 and adding 1.15 M $LiPF_6$ to the mixed solvent.

(Manufacture of Rechargeable Lithium Battery Cell)

A rechargeable lithium battery cell was manufactured using the positive electrode, the negative electrode, and the electrolyte solution described above, and a polyethylene separator.

Example 2

A rechargeable lithium battery cell was manufactured as in Example 1 except that the organic layer was formed to be 4 μm thick.

Example 3

A rechargeable lithium battery cell was manufactured as in Example 1 except that the negative electrode was manufactured as follows.

The organic layer composition was coated on the negative active material layer to form an organic layer, and the inorganic layer composition was coated on the organic layer to form an inorganic layer, thereby manufacturing a negative electrode. In this example, the organic layer was 4 μm thick, and the inorganic layer was 6 μm thick.

Example 4

The rechargeable lithium battery cell was manufactured as in Example 1 except that the negative electrode was manufactured as follows.

A composite layer composition was prepared by mixing 47.5 wt % of polyethylene particle (Mitsui Chemicals, Inc, Chemipearl W401, which were vacuum-dried after being dispersed in water) having a melting point of 110° C., an average particle size of 1 μm, and a weight average molecular weight of 5,000 g/mol; 47.5 wt % of Al$_2$O$_3$ (Sumitomo Chemical Co., Ltd., AES-12) having a particle size of 0.45 μm; and 5 wt % of an acryl-based rubber (ZEON Corporation, BM-520B) in an N-methylpyrrolidone solvent. The composite layer composition was coated on the negative active material layer to form a composite layer, thereby manufacturing a negative electrode. In this example, the composite layer was 8 μm thick. Herein, the polyethylene particle and the Al$_2$O$_3$ were included in amounts of 4.9 wt % and 4.9 wt %, respectively, based on the total weight of the negative active material layer and a coating layer including the inorganic layer and the organic layer.

Comparative Example 1

A rechargeable lithium battery was manufactured as in Example 1 except that the slurry was coated on a copper foil, dried, and then pressed with a roll presser to manufacture the negative electrode.

Comparative Example 2

A rechargeable lithium battery cell was manufactured as in Example 1 except that the negative electrode was manufactured as follows.

The inorganic layer composition was coated on the negative active material layer to form an inorganic layer, thereby manufacturing a negative electrode. In this comparative example, the inorganic layer was 6 μm thick.

Evaluation 1: Thermal Resistance Evaluation of Rechargeable Lithium Battery Cell Resistance changes depending on a temperature of the rechargeable lithium battery cells according to Examples 1 to 4 and Comparative Examples 1 and 2 were evaluated, and the results are shown in FIG. 5.

Figure 5:
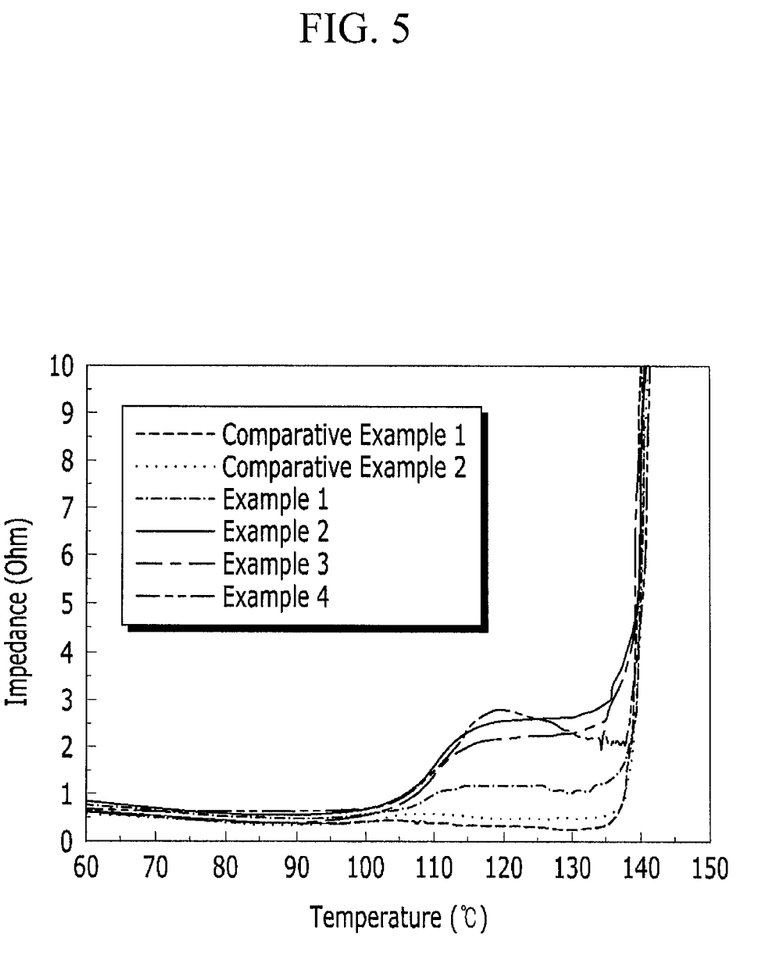
FIG. 5 is a graph of a temperature and resistance of the negative electrodes for a rechargeable lithium battery according to Examples 1 and 2 and Comparative Examples 1 and 2.

FIG. 5 is a graph showing a relationship between temperature and resistance of the rechargeable lithium battery cells according to Examples 1 to 4 and Comparative Examples 1 and 2.

Referring to FIG. 5, the rechargeable lithium battery cells using a negative electrode having a coating layer including an organic material and an inorganic material on a negative active material layer according to Examples 1 to 4 showed a lower temperature at which resistance starts to increase compared with the rechargeable lithium battery cell using a negative electrode having no coating layer according to Comparative Example 1 and the rechargeable lithium battery cell using a negative electrode coated by only an inorganic material according to Comparative Example 2. Accordingly, the organic material of Examples 1 to 4 suppressed (or reduced) exothermicity of the battery due to a shut-down function of the organic material.

Evaluation 2: Penetration Safety of Rechargeable Lithium Battery Cell

Penetration safety of the rechargeable lithium battery cells according to Examples 1 to 4 and Comparative Examples 1 and 2 were evaluated, and the results are shown in the following Table 1.

The rechargeable lithium battery cells were charged at a charge current of 0.5C up to 4.20V and cut off at 0.05C and penetration evaluation was performed by using a penetration pin having a diameter of 2.5 mm at a speed of 80 mm/sec.

TABLE 1

|  | Examples | | | | Comparative Examples | |
| --- | --- | --- | --- | --- | --- | --- |
|  | 1 | 2 | 3 | 4 | 1 | 2 |
| Evaluation result of penetration safety | Non-ignition (maximum temperature 125° C.) | Non-ignition (maximum temperature 79° C.) | Non-ignition (maximum temperature 81° C.) | Non-ignition (maximum temperature 78° C.) | Explosion | Ignition |

Referring to Table 1, the rechargeable lithium battery cells using a negative electrode having a coating layer including an organic material and an inorganic material on a negative active material layer according to Examples 1 to 4 showed excellent penetration safety compared with the rechargeable lithium battery cell using a negative electrode having no coating layer according to Comparative Example 1 and the rechargeable lithium battery cell using a negative electrode coated by only an inorganic material according to Comparative Example 2. In addition, the rechargeable lithium battery cell using a negative electrode including the organic material of Examples 1 and 2, for example, a thicker organic layer according to Example 2 showed better penetration safety. Accordingly, the negative electrode coated with an organic material and an inorganic material on the surface showed excellent penetration safety due to a shut-down function of the organic material.

While the present invention has been described in connection with certain embodiments, it is to be understood that the invention is not limited to the disclosed embodiments, but, on the contrary, is intended to cover various modifications and equivalent arrangements included within the spirit and scope of the appended claims, and equivalents thereof. While this disclosure has been described in connection with what are presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

DESCRIPTION OF SYMBOLS

10, 20, 30: negative electrode
11, 21, 31: current collector
12, 22, 32: negative active material layer
13: composite layer
14, 26, 35: organic material
15, 25, 36: inorganic material
23, 34: inorganic layer
24, 33: organic layer
100: rechargeable lithium battery
110: electrode assembly 120: battery case
130: electrode tab

What is claimed is:

1. A negative electrode for a rechargeable lithium battery, the negative electrode comprising:
    a current collector;
    a negative active material layer on the current collector; and
    a coating layer comprising an inorganic layer directly contacting the negative active material layer and including an inorganic material and an organic layer directly contacting the inorganic layer and including an organic material,
    wherein the organic material comprises a polymer particle having a melting point in a range from 85 to 130° C.,
    wherein the organic material comprises a polymer particle having a particle size in a range from 0.1 to 5 μm,
    wherein the inorganic material comprises an inorganic particle having a particle size in a range from 0.1 to 5 μm,
    wherein the organic material is included in the negative electrode in an amount in a range from 0.5 to 10 wt % based on the total amount of the negative active material layer and the coating layer,
    wherein the organic material comprises a combination of an acryl-based rubber and the polymer particle comprising at least one selected from the group consisting of a polyolefin, a polyolefin derivative, a polyolefin wax, or a combination thereof,
    wherein the inorganic material is included in the negative electrode in an amount in a range from 1 to 20 wt % based on the total amount of the negative active material layer and the coating layer, and
    wherein the organic layer does not include any inorganic material.

2. The negative electrode of claim 1, wherein the coating layer partially penetrates a surface of the negative active material layer.

3. The negative electrode of claim 1, wherein the organic layer has a thickness in a range from 1 to 10 μm, and the inorganic layer has a thickness in a range from 1 to 10 μm.

4. The negative electrode of claim 1, wherein a weight average molecular weight of the organic material is in a range from 300 to 10,000 g/mol.

5. The negative electrode of claim 1, wherein the inorganic material comprises $SiO_2$, $Al_2O_3$, $Al(OH)_3$, $AlO(OH)$, $TiO_2$, $BaTiO_2$, $ZnO_2$, $Mg(OH)_2$, $MgO$, $Ti(OH)_4$, aluminum nitride, silicon carbide, boron nitride, or a combination thereof.

6. The negative electrode of claim 1, wherein the coating layer further comprises a binder different from the organic material, the binder comprising a styrene-butadiene rubber (SBR), a carboxylmethyl cellulose (CMC), a polyvinylidene fluoride (PVdF), a polyvinylidene fluoride-hexafluoropropylene (PVdF-HFP) copolymer, an ethylenevinylacetate (EVA), a hydroxyethyl cellulose (HEC), a polyvinyl alcohol (PVA), a polyvinylbutyral (PVB), an ethylene-acrylic acid copolymer, an acrylonitrile, a vinyl acetate derivative, a polyethylene glycol, an acryl-based rubber, or a combination thereof.

* * * * *